(12) United States Patent
Pate et al.

(10) Patent No.: US 7,434,942 B2
(45) Date of Patent: Oct. 14, 2008

(54) PROJECTION SYSTEM

(76) Inventors: Michael A. Pate, 6679 N. Calle de Calipso, Tucson, AZ (US) 85718-2090; Guy Howard, 94991 Toftdahl La., Junction City, OR (US) 97448-9307

( * ) Notice: Subject to any disclaimer, the term of this patent is extended or adjusted under 35 U.S.C. 154(b) by 534 days.

(21) Appl. No.: 10/837,557

(22) Filed: Apr. 29, 2004

(65) Prior Publication Data

US 2005/0243287 A1 Nov. 3, 2005

(51) Int. Cl.
*F21V 21/26* (2006.01)
*F21V 17/02* (2006.01)
*F21V 21/30* (2006.01)
*F21V 19/02* (2006.01)
*F21S 8/08* (2006.01)

(52) U.S. Cl. .......................... 353/87; 362/269; 362/282; 362/287; 362/319; 362/372; 362/418; 362/427; 362/449

(58) Field of Classification Search .................... 353/87, 353/85; 362/233, 239, 250, 269–277, 282, 362/285, 287, 319, 372, 418, 427–429, 449, 362/419, 425, 465, 504, 508, 512–515, 523, 362/524, 531, 532, 538
See application file for complete search history.

(56) References Cited

U.S. PATENT DOCUMENTS

| | | | | |
|---|---|---|---|---|
| 5,016,150 A * | 5/1991 | Gordin et al. | ............... | 362/263 |
| 5,589,726 A * | 12/1996 | Gold | ........................... | 313/161 |
| 5,999,749 A * | 12/1999 | Kobayashi et al. | .......... | 396/106 |
| 6,109,766 A * | 8/2000 | Baliozian | ..................... | 362/287 |
| 6,186,651 B1 * | 2/2001 | Sayers et al. | ................ | 362/512 |
| 6,325,528 B1 * | 12/2001 | Wittmeier et al. | ........... | 362/514 |
| 6,445,500 B1 * | 9/2002 | Itoh | ........................... | 359/487 |
| 6,467,911 B1 * | 10/2002 | Ueyama et al. | ............... | 353/87 |
| 6,657,369 B1 * | 12/2003 | Tamaru et al. | .......... | 313/318.11 |
| 7,083,287 B2 * | 8/2006 | Pate | ........................... | 353/85 |
| 2005/0157275 A1 * | 7/2005 | Colpaert et al. | ............... | 353/97 |

* cited by examiner

*Primary Examiner*—Rochelle-Ann Blackman (57) ABSTRACT

In one embodiment, a reflector directs light toward a focal point and a light source emits the light and is adjusted with reference to an optical axis through the focal point to generate a desired illumination output. In another embodiment, a reflection system reflects light and a light source that emits the light is adjusted with reference to an optical axis such that the reflection system reflects the light toward a desired focal point according to a position of the light source.

7 Claims, 6 Drawing Sheets

PROJECTION SYSTEM

BACKGROUND

Projection systems are utilized in many aspects of modern life and provide a wide range of functionality to consumers. A projection system may be included in a projector to display images on a screen or other display device. A projection system may also be included in a rear-projection television or in a home theater system.

Projection systems are typically manufactured with fixed lamp or bulb assemblies to provide a desired illumination when a projection device is operated in a particular position, such as horizontal on a flat table. However, consumers often prop-up or elevate a projection device to an angle that provides projection of an image onto a screen or display area because it may be easier to adjust the projection angle of the projection device rather than the display area. Further, consumers often mount projection devices upside down from a ceiling in a room such that a user can still reach the operational controls of the device. These operational adjustments of a projection device can diminish the designed illumination efficiency and reduce the illumination output of a projection device.

BRIEF DESCRIPTION OF THE DRAWINGS

The same numbers are used throughout the drawings to reference like features and components.

DETAILED DESCRIPTION

The following describes embodiments of projection system(s) to adjust a lamp or bulb in a projection device that is tilted or propped-up so that the desired illumination output and/or a desired focal point can be maintained. An embodiment of projection system can be implemented to at least partially compensate for light flux which is a decrease in illumination output and which can be perceived as an image or picture that is not as clear or crisp as desired. Further, the illumination output may not be uniform. Worn lamp electrodes over time may also contribute to a decrease in illumination output efficiency which can be at least partially compensated for by an embodiment of projection system.

General reference is made herein to various embodiments of projection system(s) in an exemplary environment of a projection device. Although specific examples of a projection system may refer to particular implementations, aspects of a projection system can be implemented in any environment such as a front-projector in a home theater for display of a movie or television program, as a mobile projector for display of a slide-show presentation in a business or classroom setting, as a movie projector for display of a movie in a movie theater, as a rear-projection television, and the like. Further, the examples are not meant to limit the scope of the claims or the description, but are meant to provide a specific understanding of the embodiments of projection system(s) as described herein.

Figure 1:
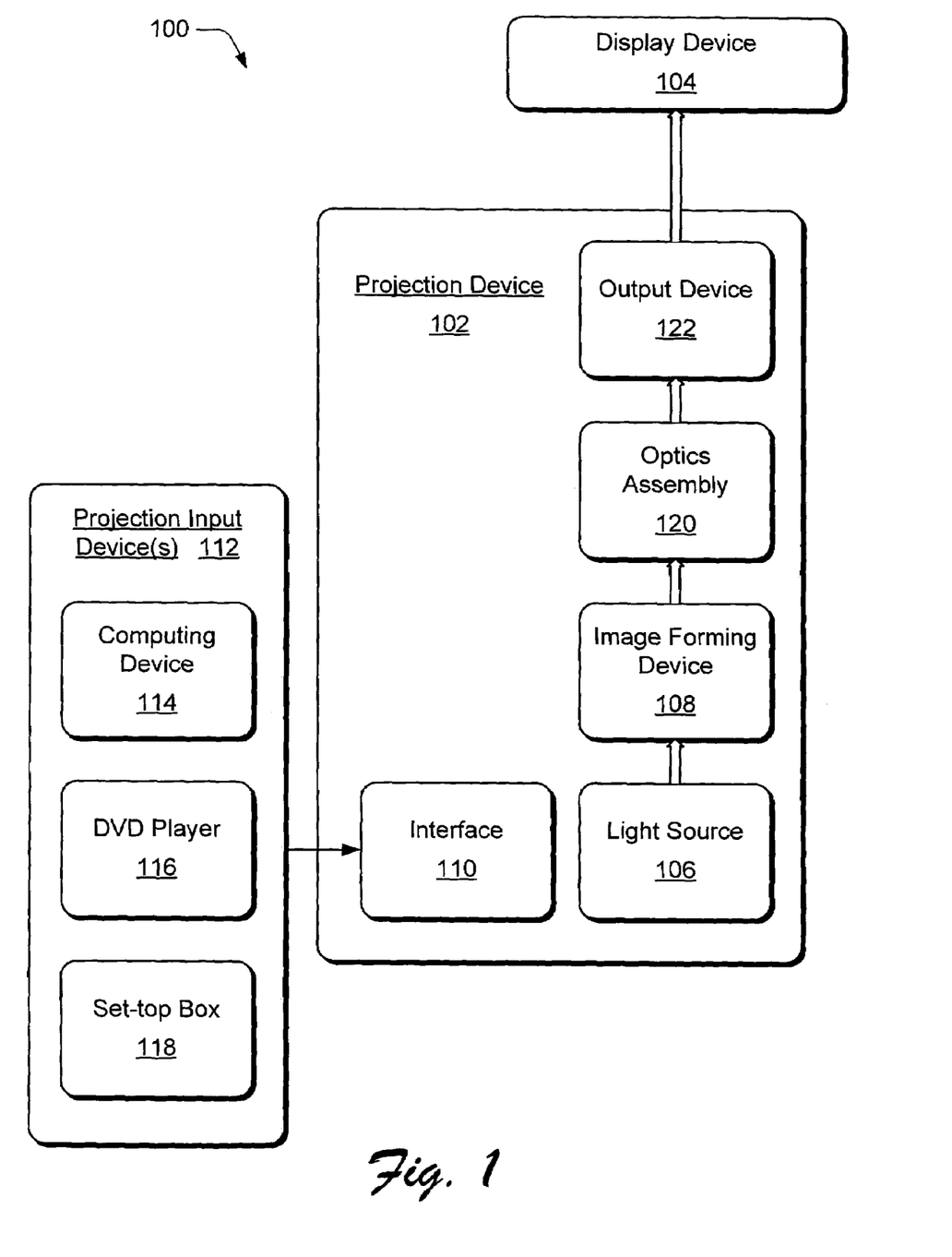
FIG. 1 illustrates an exemplary projection system.

FIG. 1 illustrates an exemplary projection system 100 which includes a projection device 102 that generates an illumination output for display on a display device 104, such as a projection screen. The projection device 102 includes a light source 106 that supplies light which is used to provide the illumination output of the projection device 102. The light source 106 may be configured in a variety of ways, such as an arc halogen discharge lamp. Arc halogen discharge lamps ionize a gaseous vapor though a high-energy arc discharge between two electrodes. Other light sources may also be utilized, such as an incandescent light bulb, a fluorescent device, white-light emitting diodes, and so forth.

Light from the light source 106 is directed toward an image forming device 108 that generates an image using the light. The image forming device 108 may include any number of different components to generate the image. In one embodiment, the image forming device 108 is configured to perform digital light processing through the use of a digital micromirror device that includes a multitude of mirrors mounted onto a substrate. The mirrors of the digital micromirror device may be rotated individually which causes each of the mirrors to either reflect or not reflect light from the light source 106.

If a single digital micromirror device is utilized, red, green, and blue (RGB) portions of an image are shown in sequence to supply a colored image. For example, a color wheel that has red, green, and blue (RGB) segments may be utilized to supply the colors. The color wheel is placed between the light source 106 and the digital micromirror device and spun to provide red, green, or blue light depending on which segment of the color wheel is placed in a pathway of light output from the light source 106 to the digital micromirror device. Configuration of the mirrors is synchronized with the placement of the segments of the color wheel in the light path to provide sequential red, green, and blue images. By supplying the sequential images in rapid sequence, a full color image is perceived by the human eye. In another embodiment, multiple digital micromirror devices are utilized to form an image. For example, separate digital micromirror devices may be utilized to provide respective outputs of red, green and blue. Light reflected from each of the separate digital micromirror devices is combined to display a full color image.

The mirrors of a digital micromirror device may be configured in response to an input received via a projection device interface 110. Any number of different projection input devices 112 may generate an input to the interface 110, such as a computing device 114, a DVD player 116, a set-top box 118, and the like. For example, computing device 114 may provide an input that causes a slide show to be displayed on the display device 104 by the image forming device 108.

In another embodiment, the image forming device 108 is configured to include a liquid-crystal display (LCD) which may include a stationary mirror. Light from the light source 106 is transmitted through the LCD and reflected from the stationary mirror to generate an image. The LCD is utilized to control the light reflected from the stationary mirror by controlling transmission of red, green, and/or blue light at each pixel of the LCD. Like the mirrors of a digital micromirror device, each pixel of the LCD may be configured in response to an input received via the projection device interface 110. Alternatively, the image forming device 108 may be implemented with a grating light valve (GLV) or a liquid crystal on silicon (LCOS) device.

Although projection device 102 is shown with the light source 106 and the image forming device 108 as separate components, any number of different components may be added, combined, and/or deleted in various embodiments to implement the light source 106 and/or the image forming device 108. For example, the image forming device 108 may be configured as a cathode-ray tube (CRT) that includes a cathode, two or more anodes, and a phosphor coated screen from which light is output.

In an embodiment, the light is directed (i.e., transmitted, emitted, and/or reflected) by the image forming device 108 to an optics assembly 120 that further transmits, emits, and/or reflects the formed image to an output device 122, such as a lens. The illuminated image output from the output device 122 is then displayed on the display device 104 for viewing. The projection device 102 is only one of any number of projection device configurations and components that can be implemented in any number of projection systems to display an illuminated image output on a display device 104.

Figure 2:
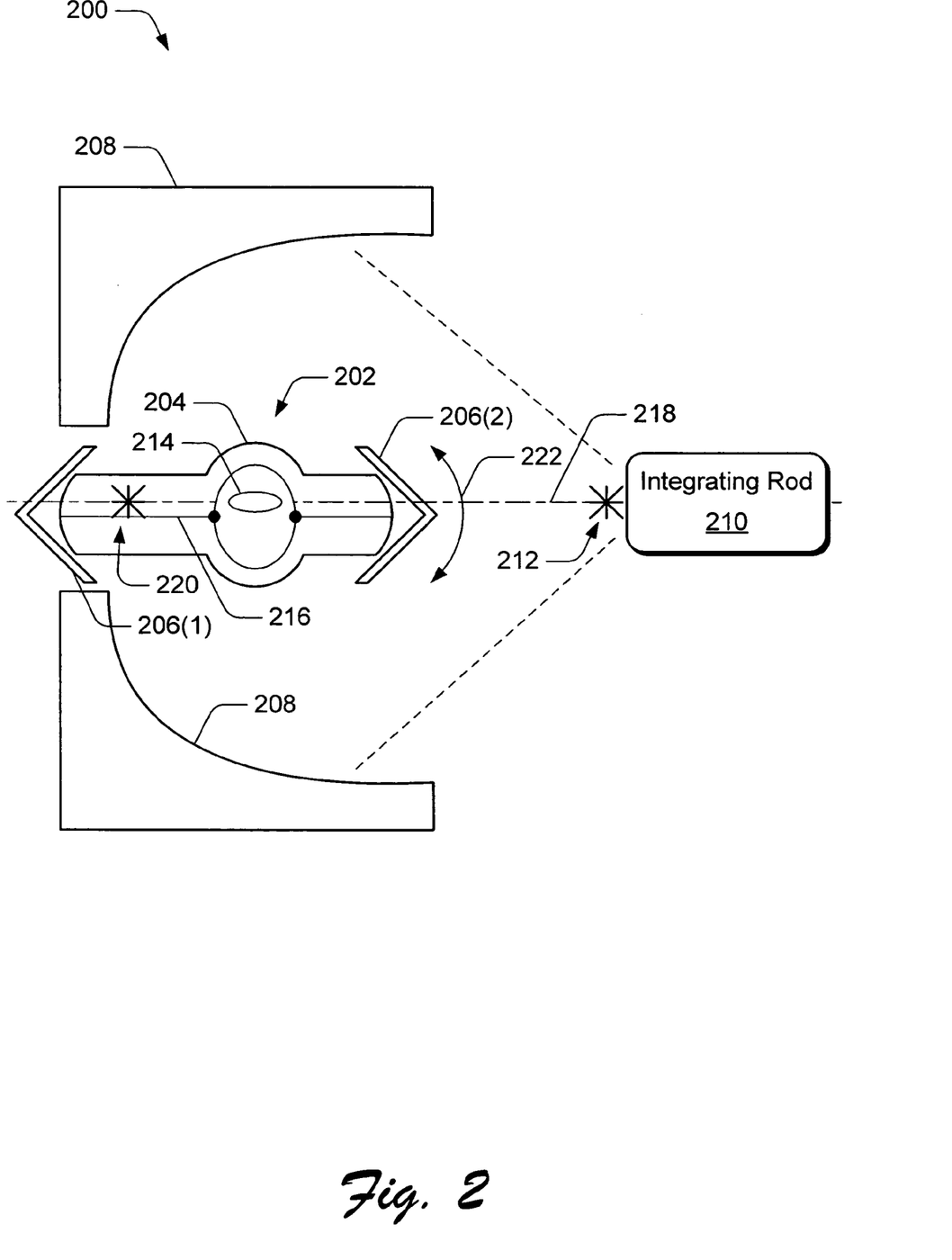
FIG. 2 illustrates exemplary projection system components that include an embodiment of a projection system in which a bulb of a light source can be tilted, aligned, translated, and/or centered.

FIG. 2 illustrates an embodiment of a projection system in which exemplary projection components 200 include a light-source that can be tilted, aligned, translated and/or centered. In this embodiment, the light source is a lamp assembly 202 that includes an arc halogen discharge lamp 204 which ionizes a gaseous vapor though a high-energy arc discharge between two electrodes. The lamp assembly 202 may also be referred to as a burner assembly, and is one example of the light source 106 shown in FIG. 1.

The lamp assembly 202 also includes lamp supports 206(1) and 206(2), and a reflector 208. The lamp supports 206(1) and 206(2) are configured to maintain the lamp 204 in a desired position. The lamp support 206(2) may be held in position by a thin external support (not shown) that can be used to change the position of lamp assembly 202. The external support does not interfere with the reflected light from reflector 208 when the external support is positioned outside of the focal depth of the reflector 208.

The projection components 200 include an integrating rod 210 that is designed to receive an illumination input directed by the reflector 208 at a focal point 212 (e.g., at an input to integrating rod 210). Light from the discharge lamp 204 of the lamp assembly 202 is emitted spherically into the reflector 208 and is then directed or focused toward the desired focal point 212. The integrating rod 210 receives the illumination input and is one example of the image forming device 108 shown in FIG. 1.

In an embodiment of a projection system that includes an arc halogen discharge lamp 204, the high-energy arc discharge between the two electrodes is a plasma arc 214 that is generated opposite of gravity due to thermal convection within the internal volume of the lamp assembly 202. The plasma arc 214 is also positioned within the internal volume of the lamp due to the internal vessel shape of the lamp assembly 202 and the fluid dynamics associated with the thermal convection. These additional factors position and/or move the plasma arc off of a mechanical axis 216 of the lamp assembly. Because of these factors and other changes in gravitational orientation caused by the placement, tilting, and/or rotation of the projection device, the plasma arc 214 may move off of the optical axis 218 of the reflector to which the lamp assembly 202 has been aligned during manufacture.

The optical axis 218 is determinable as a center-line reference through a focal point 220 and the focal point 212 which is approximately coincident with an entrance aperture of the integrating rod 210. When the lamp assembly 202 is aligned to the reflector 208, the mechanical axis 216 of the lamp assembly is decentered from the reflector optical axis 218 such that the plasma arc 214 is approximately aligned with the optical axis 218. Accordingly, the plasma arc 214, an optical axis of the integrating rod 210, and the reflector optical axis 218 are substantially collinear and aligned to provide a desired illumination output.

When a projection device is configured and operated upside down and/or elevated at one end, this may change the position of the focal point 212 and/or the position of the reflector 208 with reference to the optical axis 218, and may also misalign the plasma arc 214 with reference to the optical axis 218. For example, an image generated by a projection device mounted upside down can be inverted for viewing which may change the focal point 212 with reference to the optical axis 218 such that there is a change in the desired illumination output.

When the projection device that includes the projection components 200 is positioned upside down or elevated at one end, the lamp assembly 202 can be tilted along a plane tangential to the optical axis 218 in a direction indicated by arrows 222. Either one or both of the lamp supports 206(1) and 206(2) can be adjusted to tilt, align, translate, and/or center the lamp assembly 202 with reference to the optical axis 218 such that the focal point of the reflected illumination substantially coincides with the desired focal point 212 at an input to the integrating rod 210 and along the optical axis 218.

Figure 3:
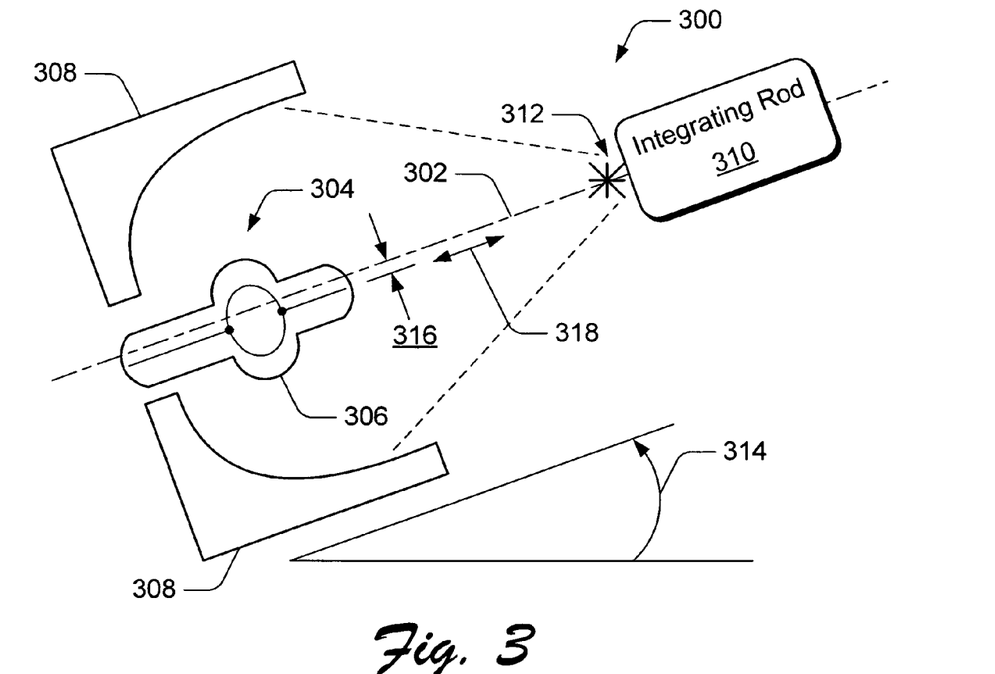
FIG. 3 illustrates exemplary projection system components that include an embodiment of a projection system in which a bulb of an exemplary light source can be positioned off-center an optical axis.

FIG. 3 illustrates an embodiment of a projection system in which exemplary projection components 300 include a light source that can be positioned off-center an optical axis 302. A lamp assembly 304 includes a replaceable lamp 306 that is an example of an arc halogen discharge lamp, and is one example of the light source 106 shown in FIG. 1.

The projection components 300 include a reflector 308 and an integrating rod 310 that is designed to receive an illumination input directed by the reflector 308 at a focal point 312 (e.g., at an input to integrating rod 310). Light from the replaceable lamp 306 is emitted spherically into the reflector 308 and is then directed or focused at the desired focal point 312. The integrating rod 310 receives the illumination input and is one example of the image forming device 108 shown in FIG. 1.

When a projection device is configured and operated upside down and/or elevated as indicated by a horizontal elevation change 314, the focal point 312 can change in reference to the optical axis 302 such that there is a change in the desired illumination output. Accordingly, the replaceable lamp 306 can be replaced with a pre-designed lamp in an elevated and/or inverted projection device to at least partially compensate for the change in reference to the optical axis 302. In this example, replaceable lamp 306 is shown positioned offset (e.g., translated orthogonally) from the optical axis 302 a distance 316 to at least partially compensate for the change in reference to the optical axis 302. Additionally, lamp 306 can be translated along the optical axis 302 in a direction indicated by arrows 318. Although the replaceable lamp 306 is shown offset below the optical axis 302 in this example, the lamp 306 may be replaced with any number of different lamps that are offset from the optical axis 302 any distance above or below the optical axis 302 for a desired illumination output.

Figure 4:
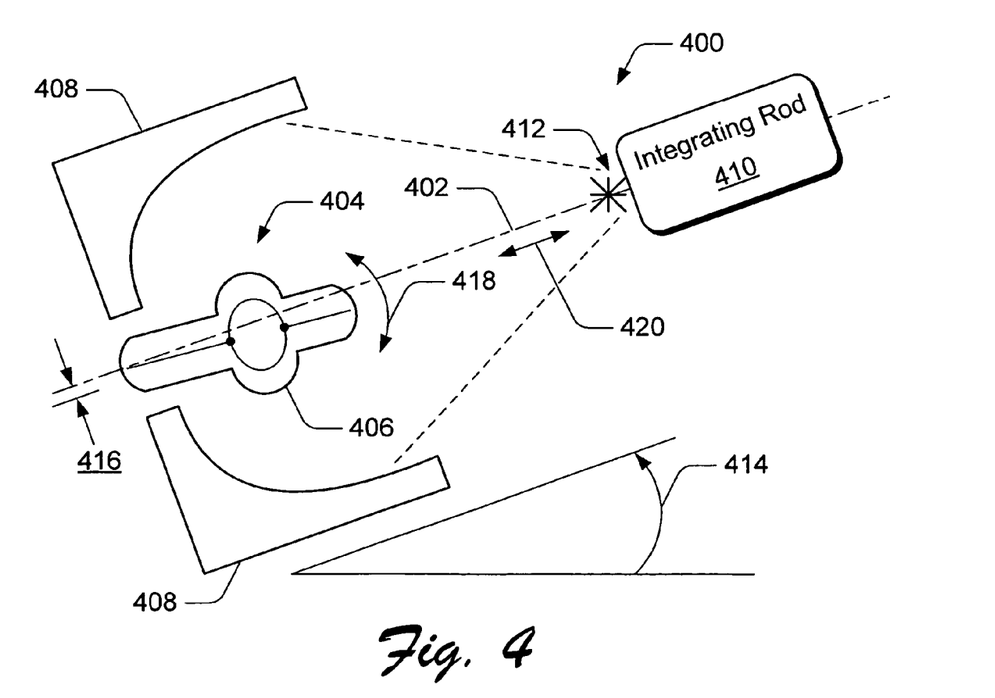
FIG. 4 illustrates exemplary projection system components that include an embodiment of a projection system in which a bulb of an exemplary light source can be tilted and positioned off-center an optical axis.

FIG. 4 illustrates an embodiment of a projection system in which exemplary projection components 400 include a light source that can be tilted and positioned off-center an optical axis 402. A lamp assembly 404 includes a replaceable lamp 406 that is an example of an arc halogen discharge lamp, and is one example of the light source 106 shown in FIG. 1.

The projection components 400 include a reflector 408 and an integrating rod 410 that is designed to receive an illumination input directed by the reflector 408 at a focal point 412 (e.g., at an input to integrating rod 410). Light from the replaceable lamp 406 is emitted spherically into the reflector 408 and is then directed or focused at the desired focal point 412. The integrating rod 410 receives the illumination input and is one example of the image forming device 108 shown in FIG. 1.

When a projection device is configured and operated upside down and/or elevated as indicated by a horizontal elevation change 414, the focal point 412 can change in reference to the optical axis 402 such that there is a change in the desired illumination output. Accordingly, the replaceable lamp 406 can be replaced with a pre-designed lamp in an elevated or inverted projection device to at least partially compensate for the change in reference to the optical axis 402. In this example, replaceable lamp 406 is shown positioned offset (e.g., translated orthogonally) from the optical axis 402 a distance 416 and tilted or decentered along a plane tangential to the optical axis 402 in a direction indicated by arrows 418 to at least partially compensate for the change in reference to the optical axis 402. Additionally, lamp 406 can be translated along the optical axis 402 in a direction indicated by arrows 420.

Although the replaceable lamp 406 is shown offset and tilted to a particular position with respect to the optical axis 402 in this example, the lamp 406 may be replaced with any number of different pre-designed lamps that are offset and/or decentered from the optical axis 402 any distance above or below the optical axis 402 for a desired illumination output. Further, a replaceable lamp 406 can be designed to tilt any number of degrees off-center of the optical axis 402 and can be designed to tilt, align, translate, and/or center the lamp 406 in the lamp assembly 404 such that the focal point of the reflected illumination substantially coincides with the desired focal point 412 at an input to the integrating rod 410.

FIGS. 5A-5D illustrate embodiments of projection system(s) in which exemplary projection components 500 include a light source that can be rotated about an optical axis. FIGS. 5A-5D illustrate a lamp assembly 502 that includes a bulb mount 504 which is configured to rotate within the lamp assembly 502. A bulb 506 in the bulb mount 504 is designed off-center from an optical axis 508 and rotates with the bulb mount 504 to maintain an alignment of the bulb 506 to the optical axis 508. In an alternate embodiment, bulb mount 504 may also be offset within the lamp assembly 502 such that the bulb mount 504 is not concentric within the lamp assembly 502.

Figure 5A:
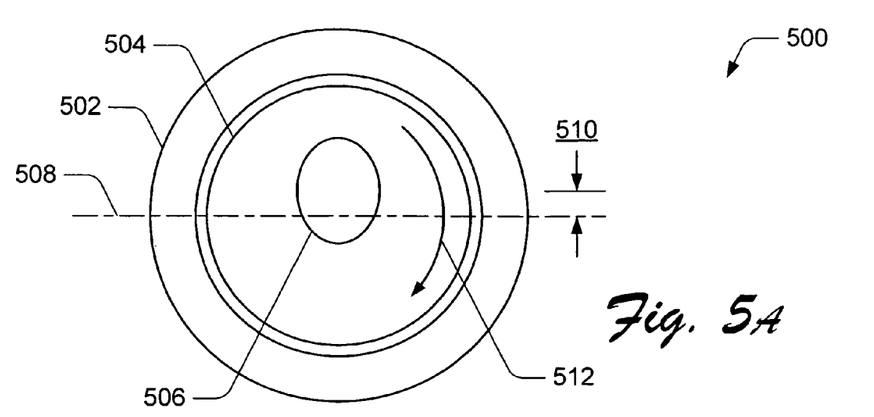
FIGS. 5A-5D illustrate exemplary projection system components that include an embodiment of a projection system in which a bulb of an exemplary light source can be rotated.
Figure 5B:
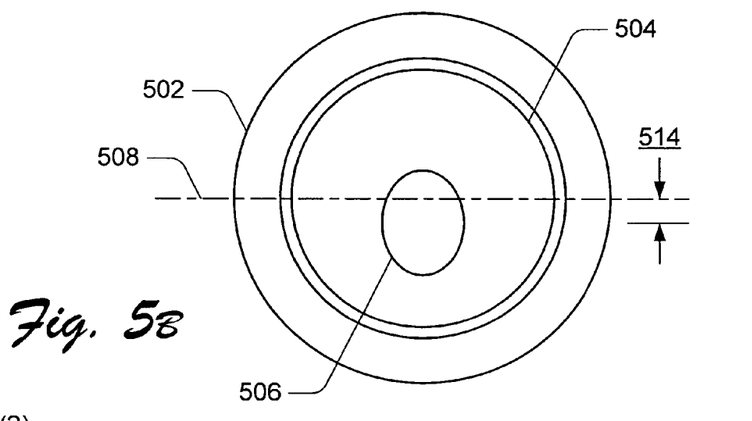

FIG. 5A illustrates the bulb mount 504 in a first position in which the bulb 506 is offset from the optical axis 508 a distance 510. When the bulb mount 504 is rotated, as indicated by arrow 512, the bulb 506 is offset below the optical axis 508 a distance 514 as shown in FIG. 5B. Accordingly, the bulb 506 can be rotated to a position with reference to the optical axis 508 that provides a desired illumination output when a projection device is configured and operated upside down and/or elevated such that there is a change in the desired illumination output.

Figure 5C:
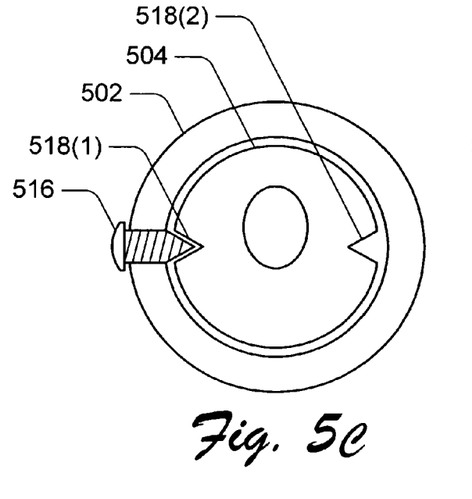

FIG. 5C illustrates an embodiment of a detent system to secure the bulb mount 504 in a particular rotated position within the lamp assembly 502. When the bulb mount 504 is rotated to a first position (e.g., as shown in FIG. 5A), a fixing device 516 can be positioned into a detent groove 518(1) to secure the bulb mount 504 in the first rotated position. When the bulb mount 504 is rotated to a second position (e.g., as shown in FIG. 5B), the fixing device 516 can be positioned into an opposite detent groove 518(2) to secure the bulb mount 504 in the second rotated position. In the example shown in FIG. 5C, the fixing device 516 is a set screw.

Figure 5D:
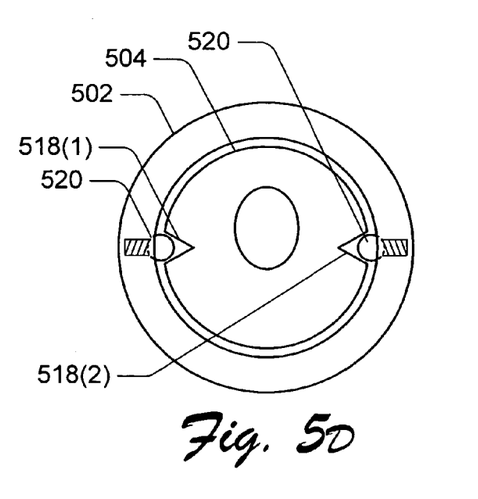

FIG. 5D illustrates another embodiment of a detent system to secure the bulb mount 504 in a particular position within the lamp assembly 502. In this example, the fixing device is spring-loaded ball-bearings 520 that are held in place in the detent grooves 518(1) and 518(2) to secure the bulb mount 504 in a rotated position. The fixing device can be a set screw 516, spring-loaded ball-bearings 520, or any other type of different fixing device that can be implemented to secure the bulb mount 504 in a particular rotated position. In an alternate embodiment, the bulb mount can be gravity orientated to rotate for a desired illumination output depending upon the operational configuration of a projection device.

Figure 6:
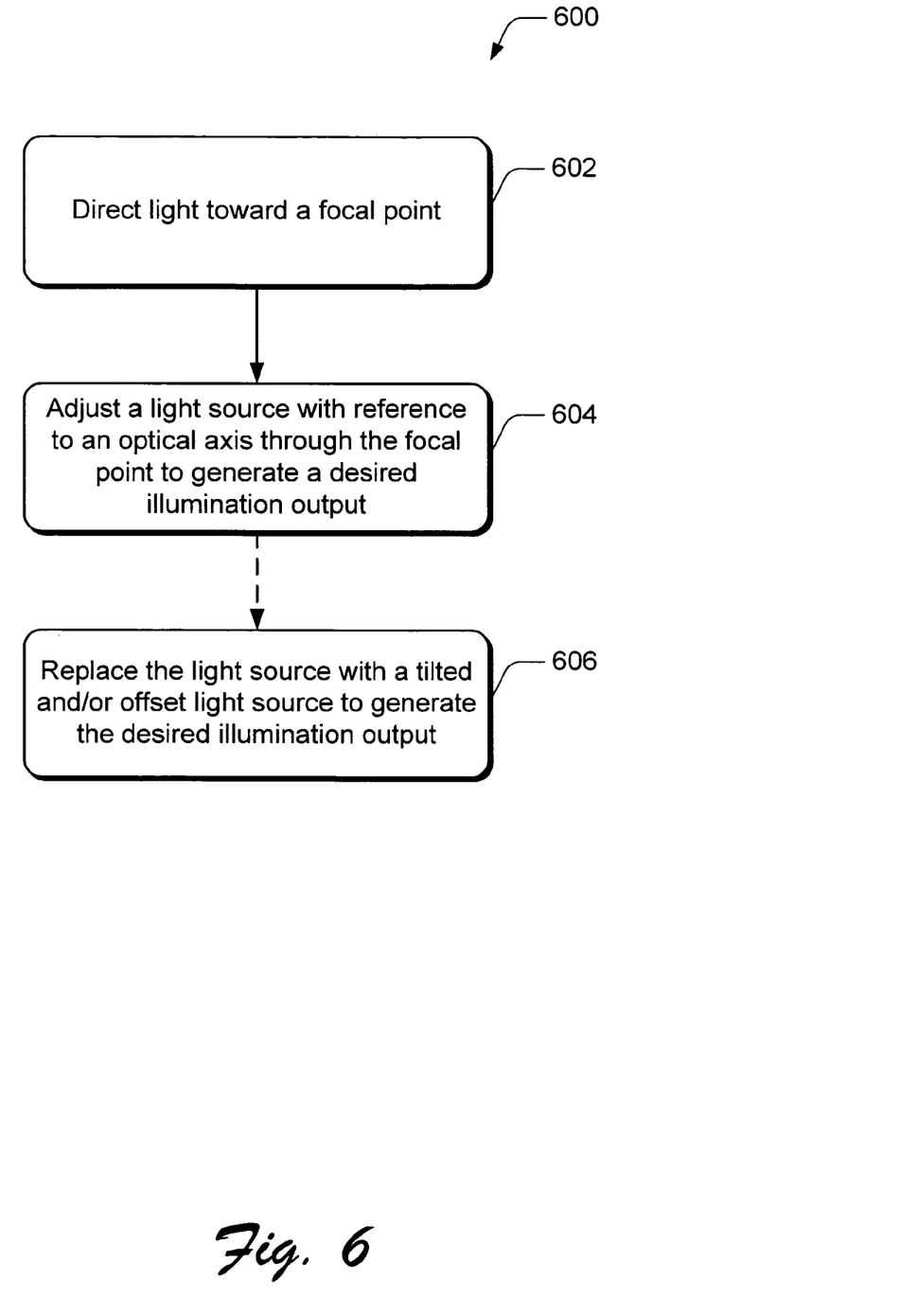
FIG. 6 is a flow diagram that illustrates an embodiment of a method for a projection system.

FIG. 6 illustrates an embodiment of a method 600 for projection system. The order in which the method is described is not intended to be construed as a limitation, and any number of the described method blocks may be combined in any order to implement the method.

At block 602, light is directed toward a focal point. For example, reflector 208 (FIG. 2) directs or reflects light emitted from lamp 204 toward focal point 212. At block 604, a light source that emits the light is adjusted with reference to an optical axis through the focal point to generate a desired illumination output. For example, lamp 204 is an exemplary light source positioned within the lamp assembly 202 to emit light with reference to the optical axis 218 through the focal point 212. Adjusting the position of the light source can include any one or more of moving a support 206 that is moveably associated with the light source 204 to position the light source, tilting the light source 204 along a plane tangential to the optical axis 218, offsetting the light source 204 orthogonally from the optical axis 218, rotating the light source 506 (FIG. 5A) about the optical axis 508, and/or translating the light source 204 along the optical axis 218 to generate the desired illumination output.

As an alternative to block 604, the light source is replaced with a tilted and/or offset light source to generate the desired illumination output at block 606. For example, a light source can be pre-designed that is tilted along a plane tangential to the optical axis and/or offset orthogonally from the optical axis to generate the desired illumination output.

Figure 7:
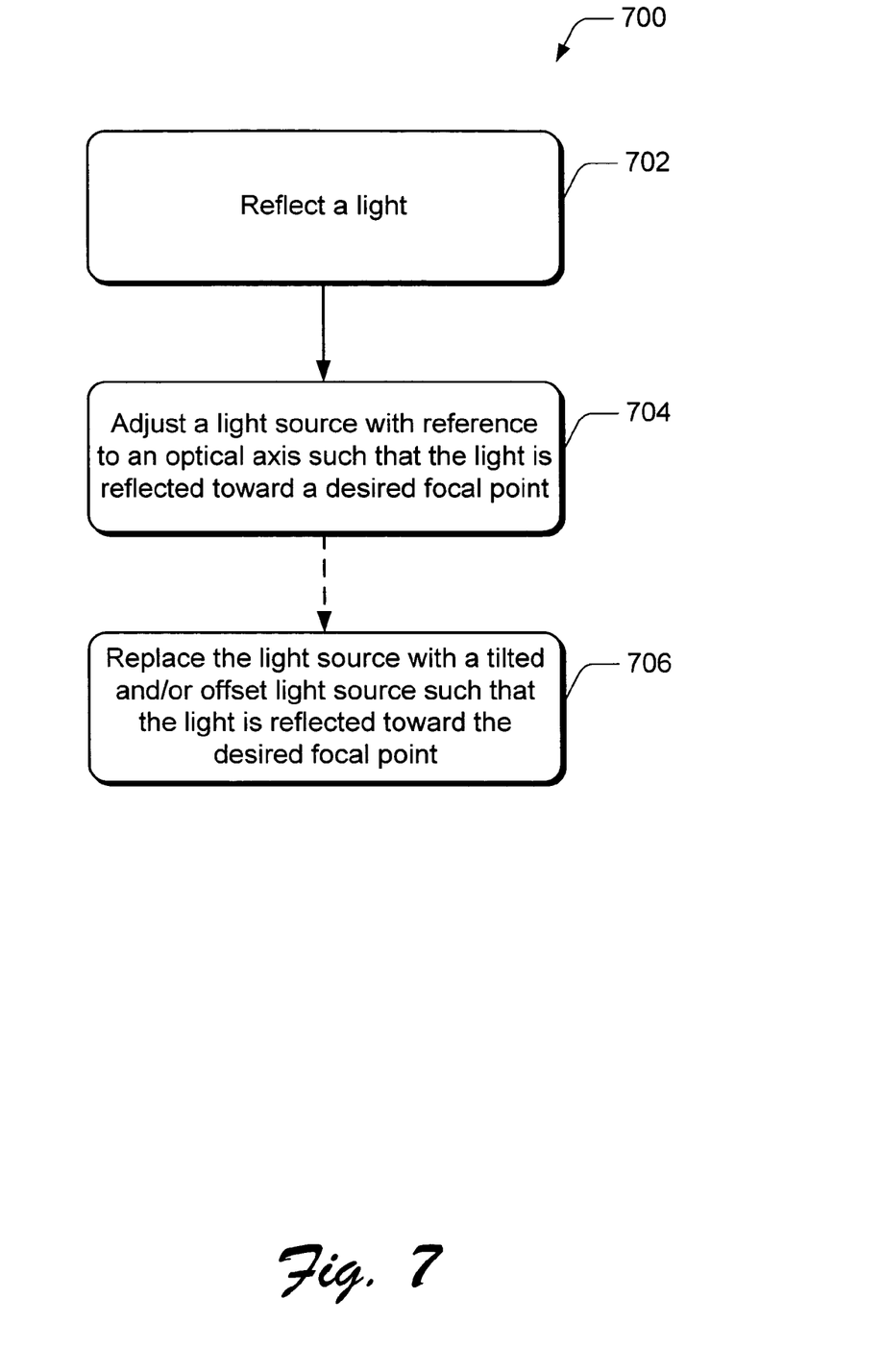
FIG. 7 is a flow diagram that illustrates an embodiment of a method for a projection system.

FIG. 7 illustrates an embodiment of a method 700 for projection system. The order in which the method is described is not intended to be construed as a limitation, and any number of the described method blocks may be combined in any order to implement the method.

At block 702, light is reflected. For example, reflector 208 (FIG. 2) reflects light emitted from lamp 204 toward focal point 212. At block 704, a light source that emits the light is adjusted with reference to an optical axis such that the light is reflected toward a desired focal point. Adjusting the position of the light source can include any one or more of moving a support 206 that is moveably associated with the light source 204 to position the light source, tilting the light source 204 along a plane tangential to the optical axis 218, offsetting the light source 204 orthogonally from the optical axis 218, rotating the light source 506 (FIG. 5A) about the optical axis 508, and/or translating the light source 204 along the optical axis 218.

As an alternative to block 704, the light source is replaced with a tilted and/or offset light source such that the light is reflected toward the desired focal point at block 706. For example, a light source can be pre-designed that is tilted along a plane tangential to the optical axis and/or offset orthogonally from the optical axis and the light source can be replaced with the pre-designed light source.

Although embodiments of projection system(s) have been described in language specific to structural features and/or methods, it is to be understood that the subject of the appended claims is not necessarily limited to the specific features or methods described. Rather, the specific features and methods are disclosed as exemplary implementations of projection system(s).

The invention claimed is:

1. A method, comprising:

emitting a light from a light source having a plasma arc in a first position with respect to an optical axis of a reflector about the light source;

moving the reflector and the light source together such that the plasma arc is moved to a second position with respect to the optical axis;

adjusting the light source with respect to the reflector to move the plasma arc towards the optical axis through the focal point to generate a desired illumination output; and replacing the light source with a tilted light source that is tilted along a plane tangential to the optical axis to generate the desired illumination output.

2. A method, comprising:

emitting a light from a light source having a plasma arc in a first position with respect to an optical axis of a reflector about the light source;

moving the reflector and the light source together such that the plasma arc is moved to a second position with respect to the optical axis;

adjusting the light source with respect to the reflector to move the plasma arc towards the optical axis through the focal point to generate a desired illumination output; and replacing the light source with an offset light source that is offset orthogonally from the optical axis to generate the desired illumination output.

3. A method, comprising:

emitting a light from a light source supported at a location in a projection device;

reflecting the light with a reflector having an optical axis;

adjusting the light source with reference to the optical axis such that the light source is aligned with the optical axis and such that the light is reflected toward a desired focal point;

moving the projection device to the different orientation, wherein the moving of the projection device misaligns the light source with reference to the optical axis;

replacing the light source with either an offset light source that is offset orthogonally from the optical axis or a tilted light source that is tilted along a plane tangential to the optical axis, wherein the offset light source or the tilted light source is substantially aligned with the optical axis while supported at the location in the projection device.

4. A method as recited in claim 3, wherein adjusting the light source includes moving a support that is moveably associated with the light source to position the light source.

5. A method as recited in claim 3, wherein adjusting the light source includes tilting the light source along a plane tangential to the optical axis.

6. A method as recited in claim 3, wherein adjusting the light source includes offsetting the light source orthogonally from the optical axis.

7. A method as recited in claim 3, wherein adjusting the light source includes translating the light source along the optical axis.

* * * * *